Oct. 26, 1937.     B. A. LINDERMAN     2,096,907
FLUID PUMP
Filed Feb. 4, 1936     2 Sheets—Sheet 2
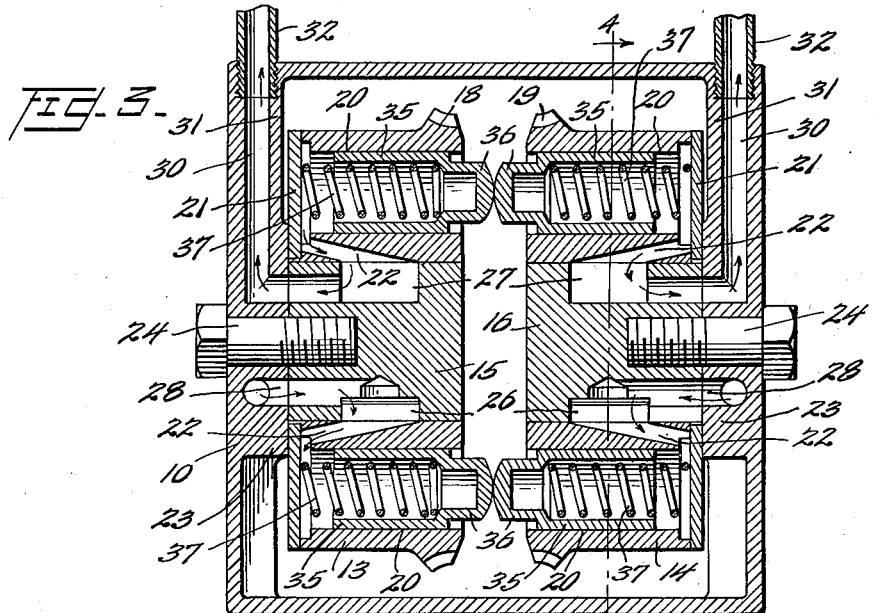
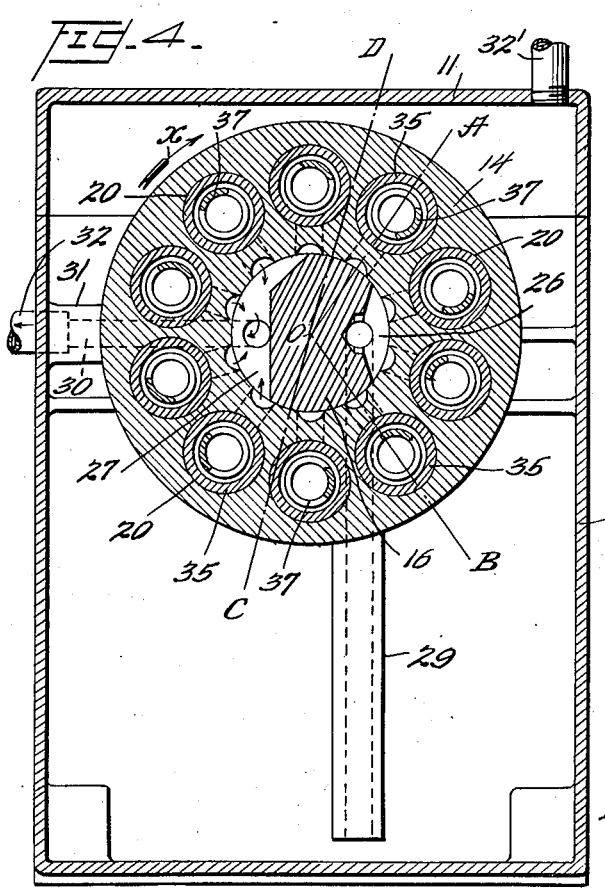
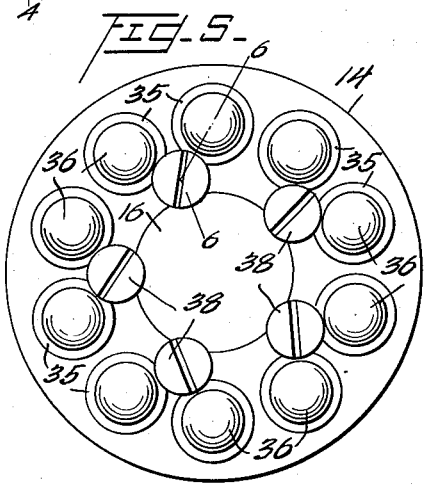
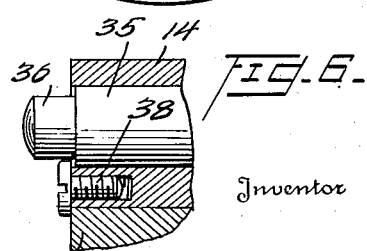

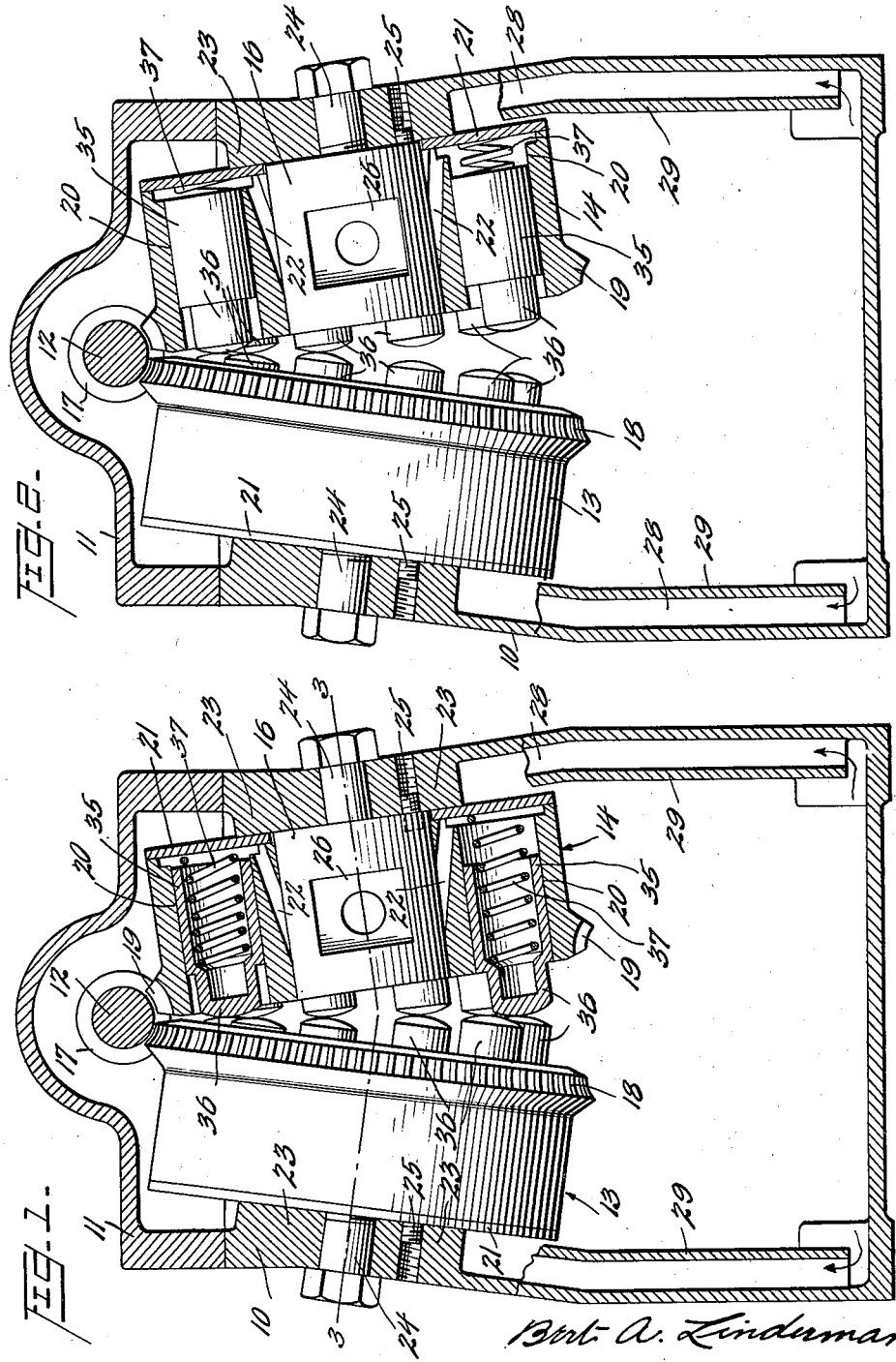

Patented Oct. 26, 1937

2,096,907

UNITED STATES PATENT OFFICE 2,096,907

FLUID PUMP

Bert A. Linderman, Homestead, Fla.

Application February 4, 1936, Serial No. 62,339

9 Claims. (Cl. 103—162)

The present invention relates to fluid pumps designed and intended for use in supplying fluid under pressure for all purposes. It is, however, particularly useful when applied to a motor vehicle and utilized to place under substantial pressure a body of fluid, such as oil, the fluid under pressure being made use of in actuating the vehicle brakes when directed by the operator into a brake operating mechanism of the fluid energized type.

Many types of fluid pumps have heretofore been designed and suggested for general and particular uses and certain of such pumps have been employed from time to time for the special purpose of providing a supply of fluid under substantial pressure, which fluid may be utilized by the driver of a motor vehicle, or the operator of some other type of machine, to conveniently and quickly apply a force at a relatively distant point but under the operator's close control. Of such pumps many have actually been used to place lubricating oil under pressure for the purpose of lubricating machine bearings, accomplishing power steering and actuating brakes. In general, however, such pumps of the prior art have been so designed and constructed as to be incapable of delivering fluid under sufficiently high pressure or, if the desired high pressures have been realized, have not had the ability to deliver an approximately constant volume of fluid for all operative speeds thereof.

As will be appreciated, it is particularly desirable in cases where fluid pumps are mounted upon motor vehicles to take the power which must necessarily be utilized for the operation of the pump directly from some engine driven element of the vehicle instead of operating the pump by means of a separate prime mover. Naturally, in the case of a pump so driven, the speed of operation of the pump will vary directly with either the speed of revolution of the crank shaft of the vehicle engine, or with the linear speed of the vehicle, unless some expensive and complicated speed control device is associated with the driving connection to the pump. In the case of a motor vehicle, the speed of which may vary within wide limits, the ordinary and usual pump will deliver many times the amount of fluid at high speeds than it will deliver at low speeds, thus rendering it necessary to utilize in addition to the pump some means for taking care of the excess quantity of fluid delivered thereby at all speeds in excess of a certain minimum speed.

One object of the present invention is to provide a pump which may be driven at widely varying speeds, for instance, from a moving part of a motor vehicle, but which will, by reason of its nature and construction, deliver substantially the same amount of fluid under pressure at all driving speeds thereof, the automatic control of the volume of fluid delivered being effected by and at the pump itself and not resulting from the employment of additional or accessory mechanisms of any kind. The pump contemplated by the present invention is furthermore of the piston type and by means of which high pressures may be realized. The improved pump is furthermore one of extreme simplicity, having comparatively few operating parts, and is of small size, being thereby readily applicable to motor vehicles as well as being inexpensive to manufacture and install.

While particularly suitable as a means for placing oil under pressure and for application to a motor vehicle, the pump has the capacity to deal with practically all kinds of fluids, especially liquids, and has many uses throughout the mechanical arts other than in connection with motor vehicles. While having the capacity to handle gases, it is primarily intended for the purpose of placing liquids under high pressure and may be utilized to pump any liquid not injurious to the pump parts and not of such viscous nature as to prevent its several operating elements from carrying out their intended functions.

The principles of pump construction underlying the invention may be embodied in pumps which vary widely in appearance and details of construction, but I prefer to carry out the invention, in actual practice, by incorporating the principles thereof in a pump of the rotary type in which a cylinder block and valve member are mounted for relative rotation about a common axis, since simplicity and economy in construction is promoted by building the pump in this manner. Furthermore, I prefer to actually construct the pump with two opposed rotors the axes of which are disposed at a slight angle, so that the ends of the pistons carried by one rotor contact with the ends of the pistons carried by the other rotor, in order that the several pistons may be successively driven upon their fluid ejection strokes by mutual action alone, no additional piston driving means being necessary.

One embodiment of the invention is illustrated in the accompanying drawings, by way of example, the pump shown being of the rotary type just above mentioned.

In the drawings:

Figure 1 is a vertical section through the pump casing, one rotor being shown in section and the other in elevation, the pump pistons being shown in the positions which they occupy, respectively, when the pump is operating at relatively low speed;

Figure 2 is a similar section but showing the pistons in the positions which they occupy during operation of the pump at a considerably higher speed;

Figure 3 is a section on line 3—3 of Figure 1;

Figure 4 is a section on line 4—4 of Figure 3;

Figure 5 is an end elevation of one of the rotors; and

Figure 6 is a section on line 6—6 of Figure 5.

The pump housing or casing is indicated at 10 in the drawings and within this casing the operating parts of the pump are enclosed. The casing need have no particular shape and may, in fact, comprise merely a supporting frame, not liquid tight. Preferably, however, I use the means for supporting the operating parts of the pump also as a liquid reservoir, as shown, and to prevent the escape of liquid through splashing, a top or closure cap 11 is provided which may be secured to the main casing 10 by any suitable devices of conventional type (not illustrated) which top or cap also rotatably supports by means of spaced bearings (not illustrated) the transversely extending driving shaft 12 by means of which driving power from without the casing is transmitted to the rotating pump parts positioned within the casing.

The pump comprises essentially two rotatable members or rotors, indicated at 13 and 14, respectively, each generally cylindrical and each provided with an axial cylindrical aperture the wall of which engages with a close sliding fit the cylindrical outer wall of a valve member, the valve members being indicated respectively at 15 and 16. The axes of the cylindrical valve members are equally inclined to the horizontal, such axes prolonged intersecting in a vertical plane which includes the axis of the driving shaft 12, and the rotors, which will be simultaneously driven in the same direction from driving shaft 12 when this last mentioned shaft revolves, due to the engagement of worm teeth 17 formed on the shaft with worm wheels 18 and 19 formed upon the rotors, will therefore revolve about axes so relatively inclined that those portions of the rotors adjacent shaft 12 will be in close proximity to each other while the portions of the rotors most remote from shaft 12 will be widely spaced. Each rotor, with its cylinders, cylinder ports and pistons, in combination with the associated valve member and fluid conduits, comprises a complete pumping unit save in one respect, i. e., a unit including these elements only has no means for driving the pistons upon their fluid ejecting strokes. By providing two such units, and arranging them in the manner shown in the drawings so that the pistons of each rotor act as driving means for the pistons of the opposite rotors, a pump of increased capacity and great simplicity is realized and the expense of manufacture and frictional loss is minimized. As the two pumping units are identical in construction, only one need be described in detail, and for the purpose of such detailed description, the unit including rotor 14 and valve member 16 will be selected.

Rotor 14 is, as shown, formed as a short hollow cylinder and has extending therethrough a plurality of cylindrical apertures 20, the axes of these apertures being parallel to the axis of rotation of the rotor, equidistantly spaced from said axis, and equidistantly spaced from each other. There may be any desired number of such cylinders but I prefer to employ such number as will insure a comparatively uniform flow of fluid from the pump outlet, rather than a pulsating flow. The larger the number of cylinders employed the more uniform will be the flow of the fluid from the pump, since the cylinders must be more closely spaced as their number increases. I have found that a rotor employing ten cylinders, such as the rotor shown in the drawings, will give a substantially even flow of fluid for all operating speeds.

One end of each cylinder 20 is open and the other end closed, the means for closing and sealing the outer ends of all ten cylinders of the rotor comprising an annular sealing plate 21 secured to one face of the rotor 14 by any suitable means (not illustrated). Each cylinder is provided with a common fluid inlet and discharge port 22, each such port extending in a diagonal direction from the cylindrical inner surface of the rotor toward that end of the associated cylinder which is sealed by the sealing plate 21. It is through these ports 22 that fluid may enter the cylinders successively, as they pass a predetermined point, and the ports likewise permit the discharge of the fluid contents of the cylinders as they successively pass a point of discharge.

The valve member 16 is formed as a cylindrical block, the cylindrical outer surface of which makes a close sliding fit with the cylindrical inner wall of the rotor. One end of this block rests against a boss or abutment 23, preferably formed integral with the wall of the casing, and the valve member is maintained in such position by means of the securing bolt 24 and the dowel pin 25, the bolt 24 holding the block closely against the boss 23 and the dowel pin 25 preventing displacement of the valve member angularly about the axis of the securing bolt 24. Formed in one side of the valve member is a fluid supply port 26 and in the opposite side of the valve member is formed a fluid receiving port 27, as clearly shown in Figure 4. The fluid supply port is relatively restricted, measured circumferentially of the valve, as compared with the fluid receiving port 27 but the two ports have identical lengths, measured in directions parallel to the axis of the valve member, so that the inner ends of cylinder ports 28 fully register successively with the fluid supply and receiving ports as the rotor revolves in the direction of the arrow X (Figure 4).

The fluid supply port 26 is in communication with the interior of the casing 10, a conduit 28, formed partly in the valve member 16 and partly in the rib 29 cast integral with the side wall of the casing, being designed and intended to conduct liquid from a point adjacent the bottom wall of the casing to the fluid supply port 26. Fluid injected into the fluid receiving port 27 is conducted away through conduit 30, formed partially in the valve member 16 and partially in a rib 31 formed integral with the side wall of the casing, a pipe 32 having threaded engagement with the inner wall of the conduit 30 at the outer end thereof, this pipe or tube being provided to receive liquid under pressure from conduit 30 and conduct it to a point of utilization. Fluid may be returned to the casing by any suitable means, the discharge end of a fluid return conduit being indicated, for instance, at 32'. The level of the oil in the casing 10 may be high or low, but is preferably below the rotors so as to avoid excessive churning of the fluid.

Slidably fitting within each cylinder is a hollow piston 35, each such piston having a reduced portion 36 projecting beyond the end of the rotor 14 and the extreme end surface of the reduced extension of each piston being rounded as shown. Confined within each piston is a coiled compression spring 37, each such spring having one end bearing against a shoulder formed interiorly of the piston and its other end bearing against the sealing ring 21. The several springs just described of course act independently and each normally urges the associated piston outwardly within the cylinder with which it is located. To limit the outward movements of the several pistons, retaining screws 38 are employed, each of these screws having a head portion which extends over the annular transverse shoulders of two adjacent pistons, as shown in Figure 5, each piston having such a shoulder where the main portion thereof meets its reduced end portion. Ordinarily, after the pump has been assembled, as shown in the drawings, the screws 38 are not called upon to restrain outward movements of the pistons, respectively, the screws being principally useful in retaining the pistons in place to facilitate assembly and disassembly of the pump.

As has been previously pointed out, the rotor 14 revolves about an axis which is disposed at a slight angle to the axis of rotor 13, although in the same plane, the prolonged axes of the rotors, and also the prolonged axes of the valve members intersecting at a point midway between the rotors. In the pump illustrated, the angle between rotor axes is 7½ degrees, but this angle may be enlarged or diminished. The rotors are also so arranged relatively to each other that the end of each piston projecting from rotor 14 will contact with the rounded end of a piston projecting from rotor 13, as shown in Figure 1. The corresponding ends of the pistons of opposed pairs of pistons will maintain mutual engagement, at least while the pump is stationary or operating at low speeds, as the rotors simultaneously revolve, although as is apparent, as any single pair of opposed pistons is carried upwardly by the simultaneous rotation of the rotors, from their lowermost to the uppermost positions, each piston will serve as a means for driving the other upon its fluid ejection stroke by reason of the fact that the cylinders, with which the pistons are associated, constantly approach each other as the upward movement occurs. After passing their uppermost positions, however, the reverse is true and the pistons are gradually projected from the cylinders within which they are respectively housed by the action of the springs associated therewith, until each such pair of opposed pistons reaches its lowermost position, after which movement of each piston into its cylinder is again commenced. By the simple arrangement shown the use of special means for driving the pistons upon their fluid ejecting strokes is avoided and friction losses are greatly reduced. Likewise no special means for securing each rotor upon its associated valve member need be provided since each rotor is acted upon by the piston springs, the joint effect of which is to press the annular backing or sealing plate thereof closely against the face of the boss 23.

Referring now more particularly to Figure 4, it will be perceived that each port 22 will, when the rotor is revolved in the direction of the arrow X, be in partial or complete register with the fluid supply port 26 while moving through the angle A, O, B and will be in partial or complete register with the fluid receiving port 27 while moving through the angle C, O, D. The cylindrical surfaces of the valve member intermediate these angles are, respectively, sealing surfaces, the ports 22 being closed while passing over these surfaces both to the inflow and outflow of fluid. As has previously been suggested, the fluid supply port 26 is relatively short, as compared with the fluid receiving port 27, measured circumferentially of the valve member. For any speed of the rotor, therefore, the period of fluid intake into a cylinder is considerably less than the period of fluid exhaust or discharge.

As each successive cylinder port comes into register with fluid supply port 26, the associated piston advances under the influence of its spring and the suction caused by the advancement of the piston draws fluid through the associated port 22 and into the cylinder in rear of the piston, the fluid in port 26 being under atmospheric pressure. This piston movement and fluid suction will continue until registration of the ports 22 and 26 is interrupted. The spring associated with each piston is capable of developing a sufficient expansive force to rapidly advance the associated piston while the cylinder port 22 is in communication with the supply port 26 but has not sufficient strength to further advance the piston after communication between these ports has been cut off. In other words, the advancing movement of each piston is instantly halted when the associated port 22 passes out of register with the fluid supply port 26, the piston spring being relatively weak and unable to produce a partial vacuum behind the piston upon which it acts. When a pump is designed in connection for use with motor vehicles, the circumferential length of the fluid supply port 26 and the expansive force which may be developed by each of the piston operating springs are carefully controlled and regulated with the end in view that, when the vehicle is proceeding at low speed, and hence the pump rotors are likewise revolving comparatively slowly, each successive cylinder port will be in register with the fluid supply port 26 for a sufficient length of time to permit full expansion of the spring, that is, the spring will advance its associated piston and maintain the piston end tightly pressed at all times against the end of the opposing piston of the opposite rotor. Under such conditions each pump unit will deliver a certain volume of fluid per unit of time and this volume of fluid per unit of time may be designated the normal output of the unit.

Assuming now the velocity of angular movement of the rotor to be doubled, each successive cylinder port will register with the fluid supply port for only one half as long a time as it did previously. During this shorter time of registration of course the associated piston spring will serve to advance its piston but the advancement of the piston will continue only for half as long a time as in the first instance described, so that, as each cylinder passes out of communication with the fluid supply port, it will only be half filled with fluid and, upon the ejection stroke of the piston, only half as much fluid will be delivered therefrom as when the rotor was revolving at half the speed. If the speed of rotation of the rotor is further increased the period of communication of each cylinder port with the fluid supply port 26 will be proportionately decreased, each piston will be advanced a proportionately less distance upon its suction stroke, and the total fluid volume delivered by the pump per unit of time will remain approximately the same. Thus, the unit will deliver substantially constant volumes of fluid for all of its working speeds and its action is automatic, there being no manual regulation necessary and no auxiliary devices of any nature being required.

Naturally, in designing the pump, not only is it necessary to carefully balance the strengths of the piston springs against the lengths of the fluid supply ports, but it is also necessary to consider the masses of the pistons and the specific gravities and viscosities of the fluids which are to be pumped. Thus, a very viscous fluid will flow more slowly than a less viscous fluid and will require either that the fluid supply port be circumferentially lengthened in order that the cylinders may be filled at low speeds, or that stronger piston advancing springs shall be utilized. Likewise it may be desirable to lighten the pistons where heavy viscous liquids are to be pumped and to increase the weights of the pistons for very light liquids.

A pump constructed as shown in the drawings will work with entire satisfaction in pumping oils such as are commonly used as motor vehicle lubricating oils and, where other fluids are to be pumped, slight experimentation with the factors just above enumerated will result in the accurate design of a pump having the capacity to deliver substantially constant volumes of that liquid per unit of time for all working speeds thereof.

Naturally, when the pump is operating at relatively high speed, that is, at speeds higher than that at which full cylinder charges are realized, the adjacent ends of corresponding pistons will not contact throughout their entire orbits in the maner illustrated in Figure 1 but will come into mutual engagement only as they approach their uppermost positions. The higher the speed, the less will be of course the angle through which the pistons will move when in contact with each other and the lower the speed the longer the periods of contact between the adjacent ends of corresponding pistons, there being full piston contact only at the lower speeds. Numerous changes in the design and arrangement of the component elements of the pump may be made, as circumstances require, without departure from the invention.

Having thus described the invention, what is claimed as new and desired to be secured by Letters Patent is:

1. In a pump, in combination, a cylinder having a port for the introduction of fluid thereinto and discharge of fluid therefrom, a valve member having spaced fluid supply and fluid escape, non-communicating ports and sealing surfaces intermediate said ports, means for conducting fluid under approximately atmospheric pressure to said supply port, means for relatively moving said cylinder and valve member at different relative speeds, whereby the mouth of the cylinder port is brought alternately into register with said ports and sealing surfaces of the valve member, the durations of such registrations varying inversely with the relative speeds of the valve member and cylinder, a piston in said cylinder, means for acting upon the piston when the cylinder port is in register with the fluid escape port of the valve member to positively drive the piston in fluid ejecting direction, and yielding means normally urging the piston in the opposite direction when the cylinder port is in register with the fluid supply port of the valve member, thereby drawing fluid into the cylinder, said yielding means being so constructed as to develop for any particular liquid, a substantially constant rate of piston movement and being of insufficient strength to cause cavitation behind the piston when the inflow of fluid into the cylinder is interrupted by the valve before the piston reaches the limit of its movement upon its suction stroke, whereby the suction strokes of the piston are decreased in length as the relative speeds of the cylinder and valve member are increased the rate of piston advance under the action of said yielding means and the angle of register of said inlet port and cylinder port being so co-related that the delivery of said pump is substantially constant irrespective of speed.

2. In a rotary fluid pump, in combination, relatively revoluble valve and cylinder members, the valve member having a fluid supply port and the cylinder member having a port leading to the cylinder, said ports being in register throughout a predetermined angle of rotation of said members relatively to each other, a piston in said cylinder, means for driving the piston in one direction to cause it to eject fluid from said cylinder, yielding means for urging the piston in the opposite direction to cause it to draw liquid into the cylinder when said ports are in register, said last mentioned means being effective to advance the piston at a substantially fixed rate when said ports are in register, mechanism for relatively rotating said members at different angular velocities and thereby to increase or decrease the periods of port registration, whereby the quantity of fluid drawn into and ejected from the cylinder for each operation of the piston may be increased or decreased the rate of piston advance under the action of said yielding means and the angle of register of said ports being so co-related that the delivery of said pump is substantially constant irrespective of speed.

3. In a rotary fluid pump, in combination, relatively rotatable members, one comprising a valve having spaced fluid supply and fluid escape ports and intermediate sealing surfaces, and the other having a plurality of cylinders each of which has a common fluid inlet and exhaust port adapted to successively register with said ports and sealing surfaces, a piston in each cylinder, means associated with each piston for yieldably urging such piston on its suction stroke, which means is only effective to advance the piston at a definite rate when the cylinder port is in register with the fluid supply port, means for positively driving each piston to its limit in the opposite direction when the port of the associated cylinder is in register with the fluid escape port, means for effecting relative rotation of said members at different angular velocities, the amount of liquid delivered by each cylinder decreasing with increase in relative angular velocity of said members and increasing with decrease of relative velocity of said members, the rate of piston advance under the action of said yielding means and the angle of register of said inlet port and cylinder ports being so co-related that the rate of liquid delivery by the pump remains substantially unchanged for all relative angular velocities of the members.

4. A multi-cylinder fluid pump comprising two rotors positioned closely adjacent one another and mounted to revolve, respectively, about axes located in a common plane and which, when prolonged, intersect, cylinders formed in said rotors, pistons slidably mounted in said cylinders, respectively, and projecting beyond the ends of the rotors, the ends of the pistons projecting from one rotor contacting respectively with the ends of the pistons projecting from the other rotor, spring means normally projecting said pistons, valve controlled means for leading fluid to and from said cylinders respectively.

5. A fluid pump comprising two cylinders, pistons slidable in said cylinders and having portions projecting from the ends thereof, and means for supporting the cylinders for revolution about fixed angularly disposed intersecting axes whereby the projecting portions of the pistons may be caused to intermittently contact, and means for revolving said cylinders.

6. A fluid pump comprising rotors mounted for rotatory movement about angularly disposed axes, cylinders formed in said rotors, the axis of each cylinder being parallel to the axis of the rotor in which it is formed, pistons slidable in said cylinders and normally projecting therefrom, and means for rotating said rotors in synchronism, the projecting piston ends contacting while said rotors are rotating through certain angles of travel and each piston acting upon the other to drive the same.

7. A fluid pump comprising rotors revoluble about axes which, when prolonged, intersect midway therebetween, a plurality of cylinders formed in each rotor, the axes of the cylinders in each rotor being parallel to the axis of rotation thereof, and the axis of each cylinder of one rotor intersecting the axis of a cylinder in the other rotor, when prolonged, pistons in said cylinders, respectively, and a spring associated with each piston and normally urging the same into contact with the corresponding piston in the other rotor.

8. A fluid pump comprising two cylinders relatively movable with their axes always parallel to intersecting lines, pistons in said cylinders, a spring for urging each piston axially of the associated cylinder in one direction, and means for actuating the cylinders to periodically bring the pistons into contact with each other so that each piston drives the other against the action of said spring.

9. The combination set forth in claim 8 in which means is provided for regulating the travel of the pistons under the influence of the springs.

BERT A. LINDERMAN.